(12) United States Patent
Wakao et al.

(10) Patent No.: US 11,199,148 B2
(45) Date of Patent: Dec. 14, 2021

(54) CONTROL DEVICE FOR EXHAUST SENSOR

(71) Applicant: TOYOTA JIDOSHA KABUSHIKI KAISHA, Toyota (JP)

(72) Inventors: Kazuhiro Wakao, Susono (JP);
Keiichiro Aoki, Sunto-gun (JP);
Yasutaka Kamiya, Inazawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/158,408

(22) Filed: Jan. 26, 2021

(65) Prior Publication Data

US 2021/0285394 A1 Sep. 16, 2021

(30) Foreign Application Priority Data

Mar. 13, 2020 (JP) .............................. JP2020-044515

(51) Int. Cl.
*F02D 41/14* (2006.01)

(52) U.S. Cl.
CPC ..... *F02D 41/1494* (2013.01); *F02D 41/1456* (2013.01)

(58) Field of Classification Search
CPC .......................... F02D 41/1456; F02D 41/1494
See application file for complete search history.

(56) References Cited

U.S. PATENT DOCUMENTS

2002/0043460 A1    4/2002    Ikeda

FOREIGN PATENT DOCUMENTS

JP    2002-071633 A    3/2002

*Primary Examiner* — Sizo B Vilakazi
*Assistant Examiner* — Mark L. Greene
(74) *Attorney, Agent, or Firm* — Finnegan, Henderson, Farabow, Garrett & Dunner, LLP

(57) ABSTRACT

A control device for an exhaust sensor is configured to control the exhaust sensor disposed in an exhaust passage of an internal combustion engine. The control device for an exhaust sensor includes: a sensor element; a heater configured to heat the sensor element; a current detection circuit configured to detect an output current of the exhaust sensor, and an electronic control device configured to control electric power that is supplied to the heater by PWM control.

6 Claims, 9 Drawing Sheets

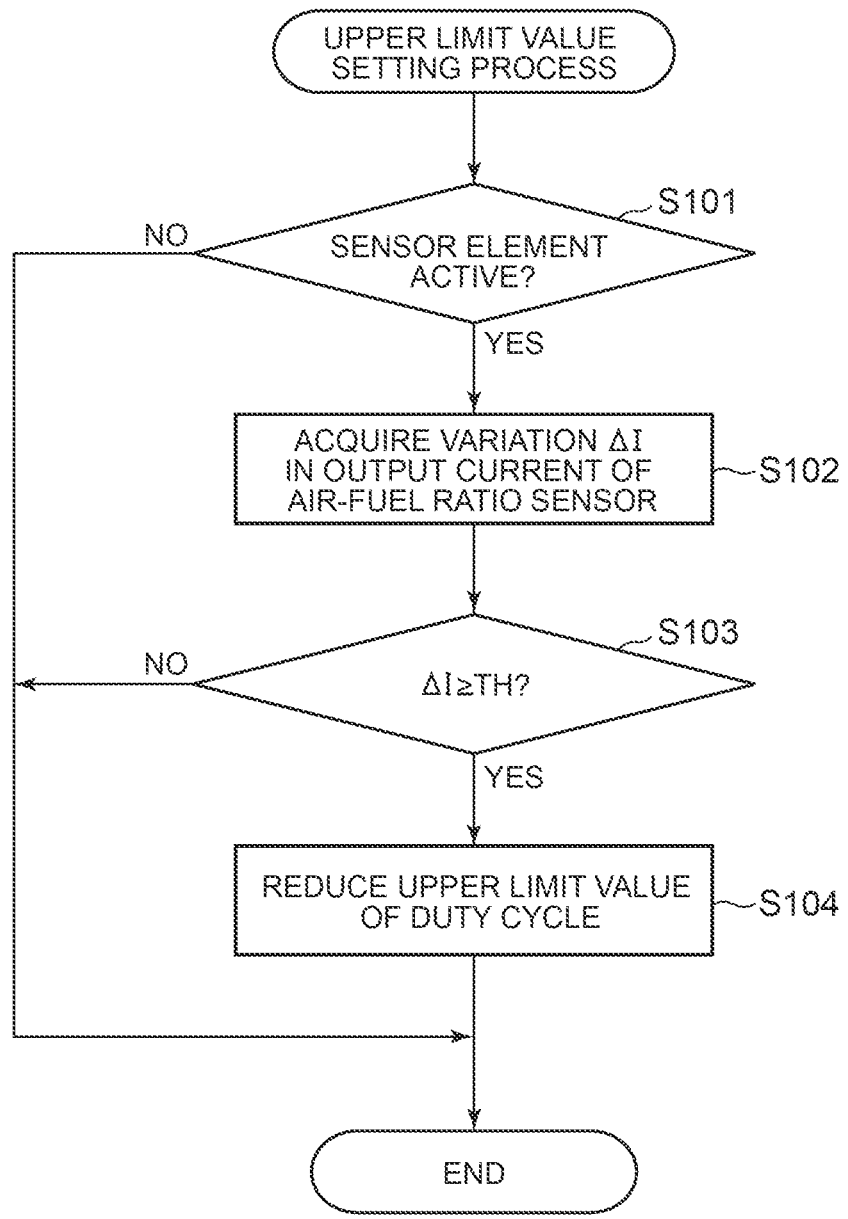

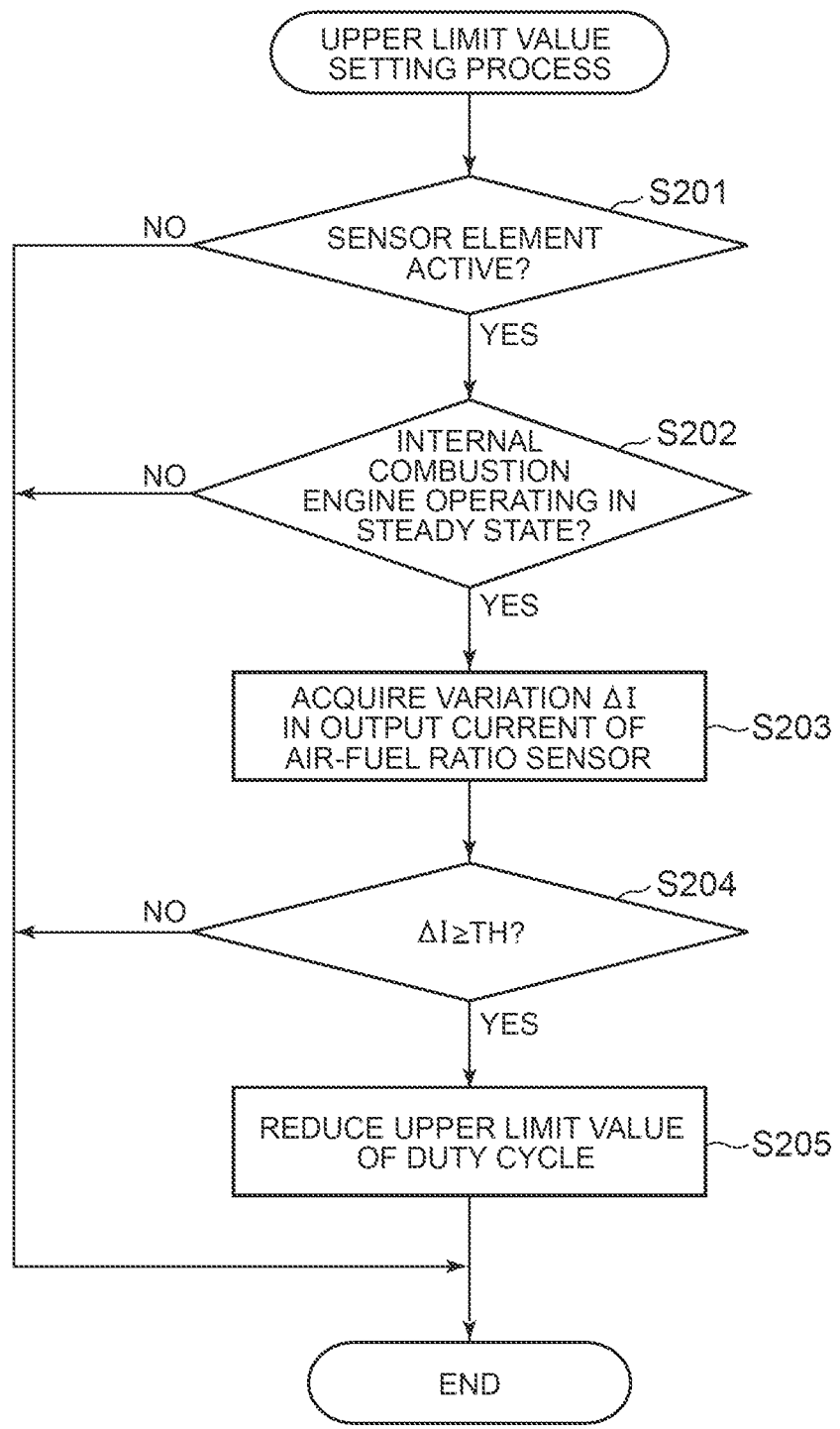

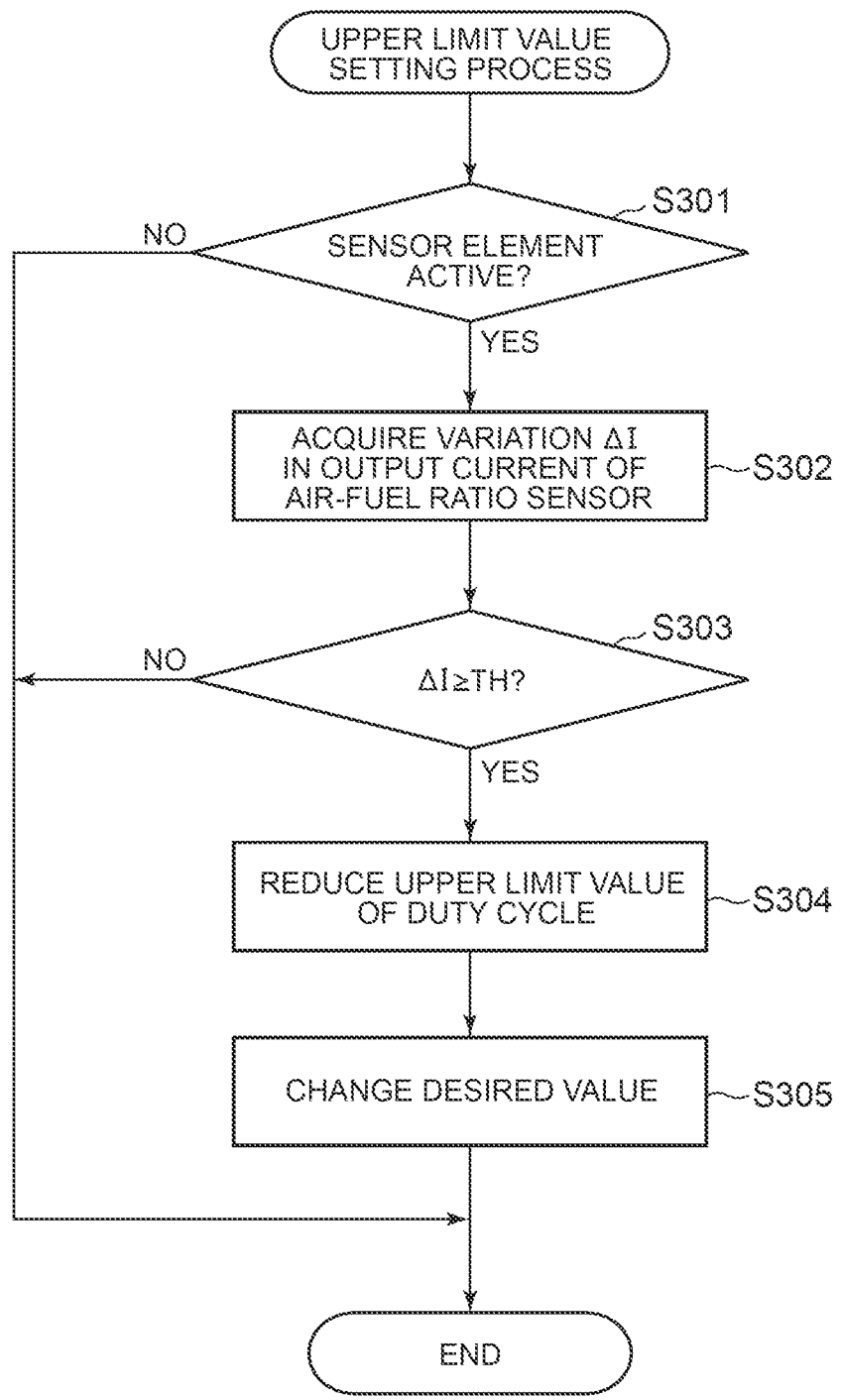

CONTROL DEVICE FOR EXHAUST SENSOR

CROSS-REFERENCE TO RELATED APPLICATION

This application claims priority to Japanese Patent Application No. 2020-044515 filed on Mar. 13, 2020, incorporated herein by reference in its entirety.

BACKGROUND

1. Technical Field

The disclosure relates to control devices for exhaust sensors.

2. Description of Related Art

It is conventionally known to dispose an exhaust sensor, which detects the concentration of a specific component in exhaust gas, in an exhaust passage of an internal combustion engine in order to reduce deterioration in exhaust emissions. In such an exhaust sensor, a sensor element is heated by a heater in order to keep the sensor element active.

The temperature of the sensor element correlates with the impedance of the sensor element. In an air-fuel ratio sensor described in Japanese Unexamined Patent Application Publication No. 2002-071633 (JP 2002-071633 A), electric power that is supplied to a heater is feedback-controlled to bring the impedance of a sensor element to desired impedance.

SUMMARY

However, as the sensor element degrades, the value of the element impedance corresponding to the same element temperature increases. Accordingly, the sensor element may overheat when the above feedback control is performed.

In the air-fuel ratio sensor described in JP 2002-071633 A, the electric power that is supplied to the heater is limited based on a semi-active temperature that indicates the degraded state of the sensor element. However, the semi-active temperature is estimated using the element impedance. Accordingly, when the relationship between the element impedance and the element temperature changes, the estimation accuracy of the semi-active temperature decreases. As a result, the electric power that is supplied to the heater may not be appropriately limited, and the sensor element may overheat.

The disclosure reduces overheating of a sensor element in an exhaust sensor that heats the sensor element by a heater.

A control device for an exhaust sensor according to an aspect of the disclosure is configured to control an exhaust sensor disposed in an exhaust passage of an internal combustion engine. The control device includes: a sensor element; a heater configured to heat the sensor element; a current detection circuit configured to detect an output current of the exhaust sensor; and an electronic control device configured to control electric power that is supplied to the heater by pulse width modulation control. The electronic control device is configured to set an upper limit value of a duty cycle in the pulse width modulation control to a lower value, when a variation in the output current of the exhaust sensor detected by the current detection circuit is equal to or greater than a threshold, than when the variation is smaller than the threshold.

In the above aspect, the variation may be a variation in the output current of the exhaust sensor synchronized with a period of the pulse width modulation control.

In the above aspect, the variation may be a variation in the output current of the exhaust sensor detected by the current detection circuit when the internal combustion engine is operating in a steady state.

In the above aspect, the electronic control device may be configured to control the electric power that is supplied to the heater so as to bring impedance of the sensor element to a desired value, and may be configured to change the desired value so as to reduce the variation in the output current of the exhaust sensor to a value smaller than the threshold, when the variation is equal to or greater than the threshold.

In the above aspect, the electronic control device may be configured to control the electric power that is supplied to the heater so as to bring impedance of the sensor element to a desired value, and may be configured to correct the impedance so as to reduce the variation in the output current of the exhaust sensor to a value smaller than the threshold, when the variation is equal to or greater than the threshold.

In the above aspect, the electronic control device may be configured to set the upper limit value in such a manner that the greater the variation in the output current of the exhaust sensor, the lower the upper limit value, when the variation is equal to or greater than the threshold.

According to the disclosure, overheating of a sensor element is reduced in an exhaust sensor that heats the sensor element by a heater.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart of a control routine of an upper limit value setting process according to the first embodiment of the disclosure;

FIG. 9 is a flowchart of a control routine of an upper limit value setting process according to a second embodiment of the disclosure; and FIG. 10 is a flowchart of a control routine of an upper limit value setting process according to a third embodiment of the disclosure.

DETAILED DESCRIPTION OF EMBODIMENTS

Embodiments of the disclosure will be described in detail with reference to the drawings. In the following description, similar components are denoted with the same signs.

First Embodiment

First, a first embodiment of the disclosure will be described with reference to FIGS. 1 to 8.

General Description of Internal Combustion Engine

Figure 1:
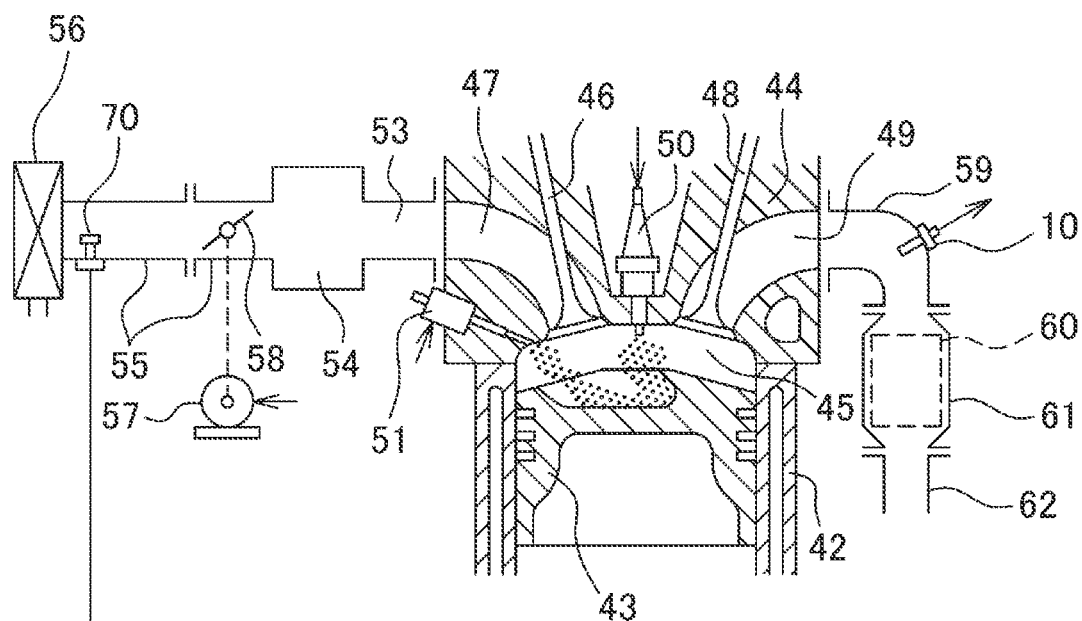
FIG. 1 schematically illustrates an internal combustion engine to which a control device for an exhaust sensor according to a first embodiment of the disclosure is applied.
Figure 1:
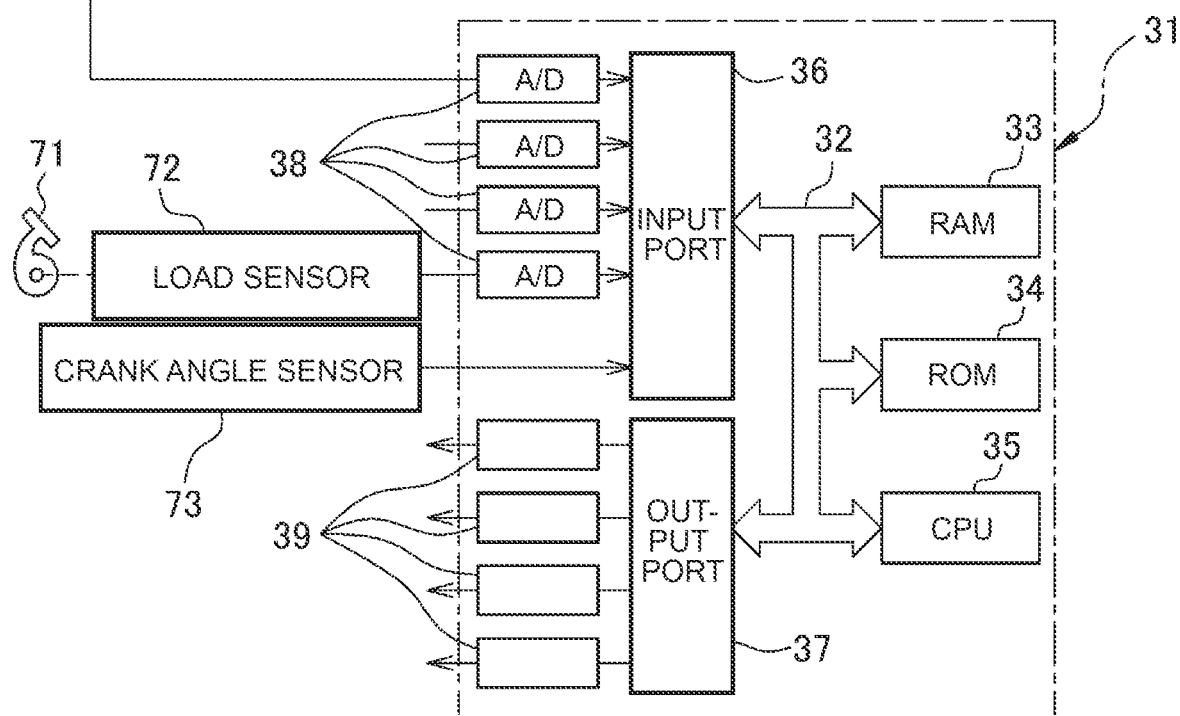

FIG. 1 schematically illustrates an internal combustion engine to which a control device for an exhaust sensor according to the first embodiment of the disclosure is applied. The internal combustion engine shown in FIG. 1 is a spark ignition internal combustion engine. The internal combustion engine is mounted on a vehicle.

Referring to FIG. 1, 42 denotes a cylinder block, 43 denotes a piston that reciprocates within the cylinder block 42, 44 denotes a cylinder head fixed on the cylinder block 42, 45 denotes a combustion chamber formed between the piston 43 and the cylinder head 44, 46 denotes an intake valve, 47 denotes an intake port, 48 denotes an exhaust valve, and 49 denotes an exhaust port. The intake valve 46 opens and closes the intake port 47, and the exhaust valve 48 opens and closes the exhaust port 49.

As shown in FIG. 1, a spark plug 50 is disposed in the middle portion of the inner wall surface of the cylinder head 44, and a fuel injection valve 51 is disposed in the peripheral portion of the inner wall surface of the cylinder head 44. The spark plug 50 is configured to create a spark in response to an ignition signal. The fuel injection valve 51 injects a predetermined amount of fuel into the combustion chamber 45 in response to an injection signal. In the present embodiment, gasoline with a stoichiometric air-fuel ratio of 14.6 is used as the fuel.

Each intake port 47 for each cylinder is coupled to a surge tank 54 through a corresponding one of intake branch pipes 53. The surge tank 54 is coupled to an air cleaner 56 through an intake pipe 55. The intake port 47, the intake branch pipe 53, the surge tank 54, the intake pipe 55, etc. form an intake passage for guiding air to the combustion chamber 45. A throttle valve 58 that is driven by a throttle valve drive actuator 57 is disposed in the intake pipe 55. The throttle valve 58 is rotated by the throttle valve drive actuator 57, so that the throttle valve 58 can change the opening area of the intake passage.

Each exhaust port 49 for each cylinder is coupled to an exhaust manifold 59. The exhaust manifold 59 has a plurality of branches and a collector. The branches are coupled to the exhaust ports 49 and also converge into the collector. The collector of the exhaust manifold 59 is coupled to a casing 61 containing a catalyst 60. The casing 61 is coupled to an exhaust pipe 62. The exhaust port 49, the exhaust manifold 59, the casing 61, the exhaust pipe 62, etc. form an exhaust passage for discharging exhaust gas generated by combustion of an air-fuel mixture in the combustion chamber 45. The catalyst 60 is, e.g., a three-way catalyst capable of simultaneously removing hydrocarbons (HC), carbon monoxide (CO), and nitrogen oxides (NOx).

An electronic control unit (ECU) 31 performs various controls of the internal combustion engine. That is, the ECU 31 functions as a control device for the internal combustion engine. The ECU 31 receives outputs of various sensors provided in the internal combustion engine and controls various actuators of the internal combustion engine based on the outputs of the various sensors etc.

The ECU 31 is a digital computer and includes a random access memory (RAM) 33, a read only memory (ROM) 34, a microprocessor (CPU) 35, an input port 36, and an output port 37. The RAM 33, the ROM 34, the CPU 35, the input port 36, and the output port 37 are connected to each other via a bidirectional bus 32. Although one ECU 31 is provided in the present embodiment, a plurality of ECUs may be provided for each function.

An air flow meter 70 is disposed in the intake pipe 55. The air flow meter 70 detects the flow rate of air flowing in the intake pipe 55. The output of the air flow meter 70 is applied to the input port 36 via a corresponding one of analog-to-digital (A-to-D) converters 38.

An air-fuel ratio sensor 10 is disposed upstream of the catalyst 60 in the exhaust passage (the collector of the exhaust manifold 59). The air-fuel ratio sensor 10 detects the air-fuel ratio of the exhaust gas discharged from the combustion chamber 45 of the internal combustion engine and entering the catalyst 60. The air-fuel ratio sensor 10 will be described in detail later.

A load sensor 72 is connected to an accelerator pedal 71 provided in the vehicle equipped with the internal combustion engine. The load sensor 72 generates an output voltage that is proportional to the amount of depression of the accelerator pedal 71. The output voltage of the load sensor 72 is applied to the input port 36 via a corresponding one of the A-to-D converters 38. The ECU 31 calculates engine load based on the output of the load sensor 72.

A crank angle sensor 73 is connected to the input port 36. The crank angle sensor 73 generates an output pulse every time a crankshaft rotates by a predetermined angle (e.g., 10°). The output pulses are applied to the input port 36. The ECU 31 calculates an engine speed based on the output of the crank angle sensor 73.

The output port 37 is connected to the various actuators of the internal combustion engine via drive circuits 39. In the present embodiment, the output port 37 is connected to the spark plug 50, the fuel injection valve 51, and the throttle valve drive actuator 57, and the ECU 31 controls these components. Specifically, the ECU 31 controls the ignition timing of the spark plug 50, the injection timing and injection amount of the fuel injection valve 51, and the opening degree of the throttle valve 58.

The internal combustion engine is a non-supercharged internal combustion engine that uses gasoline as fuel. However, the configuration of the internal combustion engine is not limited to the above configuration. The specific configuration of the internal combustion engine, such as cylinder arrangement, fuel injection mode, configurations of intake and exhaust systems, configuration of a valve train, and presence or absence of a supercharger, may be different from the configuration shown in FIG. 1. For example, the fuel injection valve 51 may be disposed so as to inject fuel into the intake port 47. The internal combustion engine may be a compression ignition internal combustion engine (diesel engine).

Configuration of Air-Fuel Ratio Sensor

In the present embodiment, the internal combustion engine includes the air-fuel ratio sensor 10 as an exhaust sensor that detects a specific component in exhaust gas. As described above, the air-fuel ratio sensor 10 is disposed in the exhaust passage of the internal combustion engine. The configuration of the air-fuel ratio sensor 10 will be described.

Figure 2:
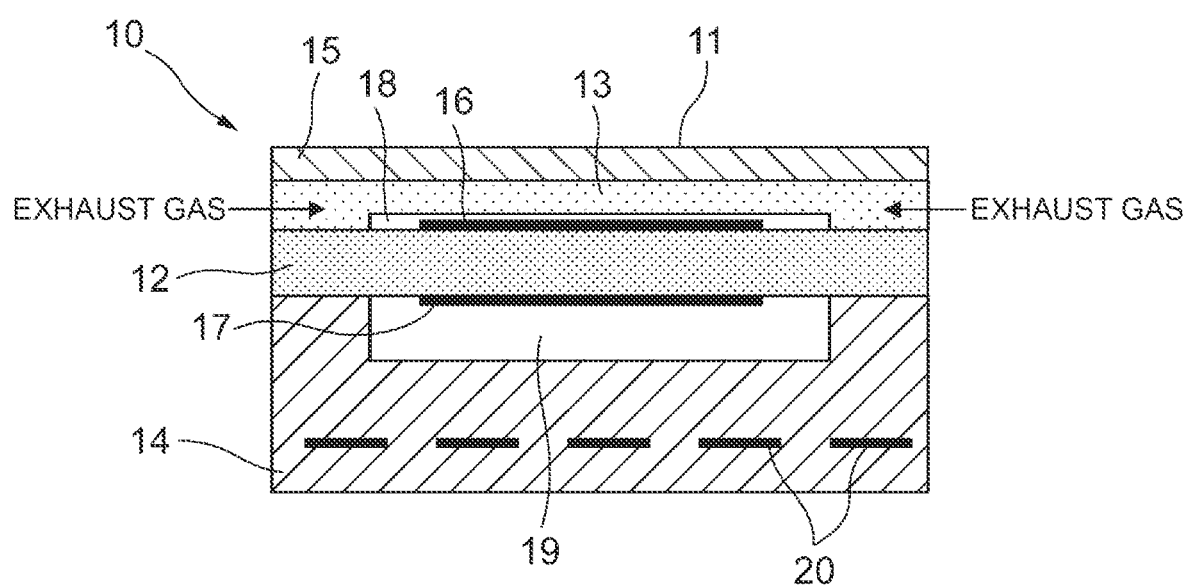
FIG. 2 is a partial sectional view of an air-fuel ratio sensor.

FIG. 2 is a partial sectional view of the air-fuel ratio sensor 10. The air-fuel ratio sensor 10 includes a sensor element 11 and a heater 20.

In the present embodiment, the air-fuel ratio sensor 10 is a multilayered air-fuel ratio sensor composed of a plurality of layers stacked on top of one another. The sensor element 11 includes a solid electrolyte layer 12, a diffusion-controlled layer 13, a first impermeable layer 14, a second impermeable layer 15, an exhaust-side electrode 16, and an atmosphere-side electrode 17. The solid electrolyte layer 12, the exhaust-side electrode 16, and the atmosphere-side electrode 17 form a sensor cell that is an electrochemical cell.

The layers of the sensor element 11 are stacked in the following order from the bottom in FIG. 2: the first impermeable layer 14, the solid electrolyte layer 12, the diffusion-controlled layer 13, and the second impermeable layer 15. The sensor element 11 has a measurement gas chamber 18 between the solid electrolyte layer 12 and the diffusion-controlled layer 13 and a reference gas chamber 19 between the solid electrolyte layer 12 and the first impermeable layer 14.

Exhaust gas flowing in the exhaust passage is introduced into the measurement gas chamber 18 as a measurement gas, namely a gas to be measured. Reference gas is introduced into the reference gas chamber 19. The reference gas is, e.g., the atmosphere. In this case, the reference gas chamber 19 is open to the atmosphere.

The solid electrolyte layer 12 is an oxide ion conductive thin plate. The solid electrolyte layer 12 is, e.g., a sintered compact of $ZrO_2$ (zirconia), $HfO_2$, $ThO_2$, $Bi_2O_3$, etc. with CaO, MgO, $Y_2O_3$, $Yb_2O_3$, etc. as a stabilizer. The diffusion-controlled layer 13 is a gas permeable thin plate. The diffusion-controlled layer 13 is made of, e.g., porous ceramic such as alumina, magnesia, silica, spinel, or mullite. The first impermeable layer 14 and the second impermeable layer 15 are gas impermeable thin plates and contains, e.g., alumina.

The exhaust-side electrode 16 is disposed on the surface of the solid electrolyte layer 12 which faces the measurement gas chamber 18 so that the exhaust-side electrode 16 is exposed to the measurement gas in the measurement gas chamber 18. The atmosphere-side electrode 17 is disposed on the surface of the solid electrolyte layer 12 which faces the reference gas chamber 19 so that the atmosphere-side electrode 17 is exposed to the reference gas in the reference gas chamber 19. The exhaust-side electrode 16 and the atmosphere-side electrode 17 are disposed so as to face each other with the solid electrolyte layer 12 interposed therebetween. The exhaust-side electrode 16 and the atmosphere-side electrode 17 are made of a noble metal with high catalytic activity such as platinum (Pt). For example, the exhaust-side electrode 16 and the atmosphere-side electrode 17 are porous cermet electrodes mainly containing Pt.

The heater 20 is disposed in the sensor element 11 and heats the sensor element 11. In the present embodiment, the heater 20 is embedded in the first impermeable layer 14. The heater 20 is, e.g., a cermet thin plate containing platinum (Pt) and a ceramic (e.g., alumina etc.). The heater 20 is a heating element that generates heat when a current is applied thereto.

The configuration of the air-fuel ratio sensor 10 is not limited to the above configuration. For example, the air-fuel ratio sensor 10 may have a cup-shaped structure.

Control Device for Exhaust Sensor

Figure 3:
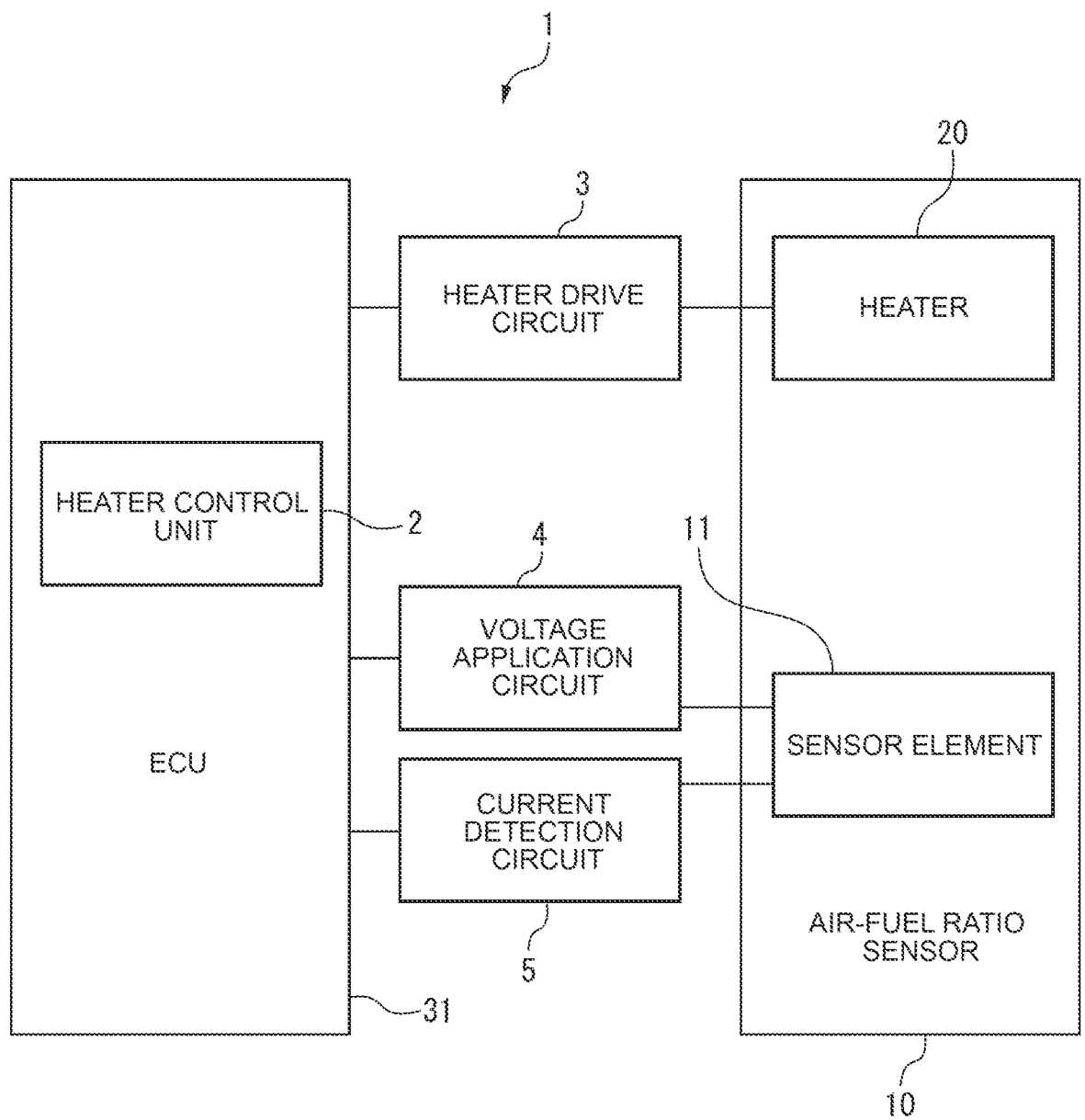
FIG. 3 schematically illustrates the configuration of the control device for an exhaust sensor according to the first embodiment of the disclosure.

FIG. 3 schematically illustrates the configuration of a control device 1 for an exhaust sensor according to the first embodiment of the disclosure. The control device 1 for an exhaust sensor includes a voltage application circuit 4 and a current detection circuit 5.

The voltage application circuit 4 is connected to the sensor element 11 and applies a voltage to the sensor element 11. Specifically, the voltage application circuit 4 applies a voltage to the sensor element 11 so that the potential of the atmosphere-side electrode 17 becomes higher than that of the exhaust-side electrode 16. Accordingly, the exhaust-side electrode 16 functions as a negative electrode, and the atmosphere-side electrode 17 functions as a positive electrode. The voltage application circuit 4 is connected to the ECU 31, and the ECU 31 can control via the voltage application circuit 4 a voltage that is applied to the air-fuel ratio sensor 10.

The current detection circuit 5 is connected to the sensor element 11 and detects an output current of the air-fuel ratio sensor 10. Specifically, the current detection circuit 5 detects a current flowing between the exhaust-side electrode 16 and the atmosphere-side electrode 17 as the output current of the air-fuel ratio sensor 10. The current detection circuit 5 is connected to the ECU 31, and the output of the current detection circuit 5 is applied to the ECU 31. Accordingly, the ECU 31 can acquire the output current of the air-fuel ratio sensor 10 detected by the current detection circuit 5 from the current detection circuit 5.

Figure 4:
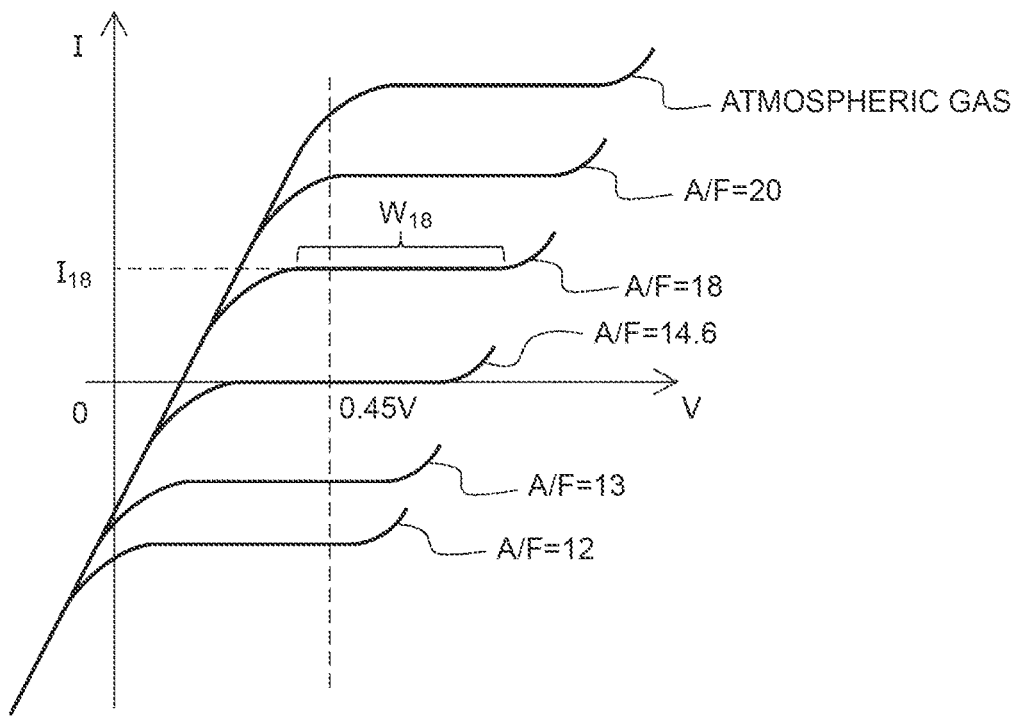
FIG. 4 illustrates voltage-current (V-I) characteristics of the air-fuel ratio sensor.

FIG. 4 illustrates voltage-current (V-I) characteristics of the air-fuel ratio sensor 10. As can be seen from FIG. 4, the higher (leaner) the air-fuel ratio of the exhaust gas, the larger the output current I of the air-fuel ratio sensor 10. The V-I curves for each air-fuel ratio have a range substantially parallel to the V axis, that is, a range where the output current hardly changes even when the applied voltage changes. This voltage range is referred to as the limit current range, and the current in this range is referred to as the limit current. In FIG. 4, $W_{18}$ and $I_{18}$ represent the limit current range and the limit current in the case where the air-fuel ratio of the exhaust gas is 18, respectively.

Figure 5:
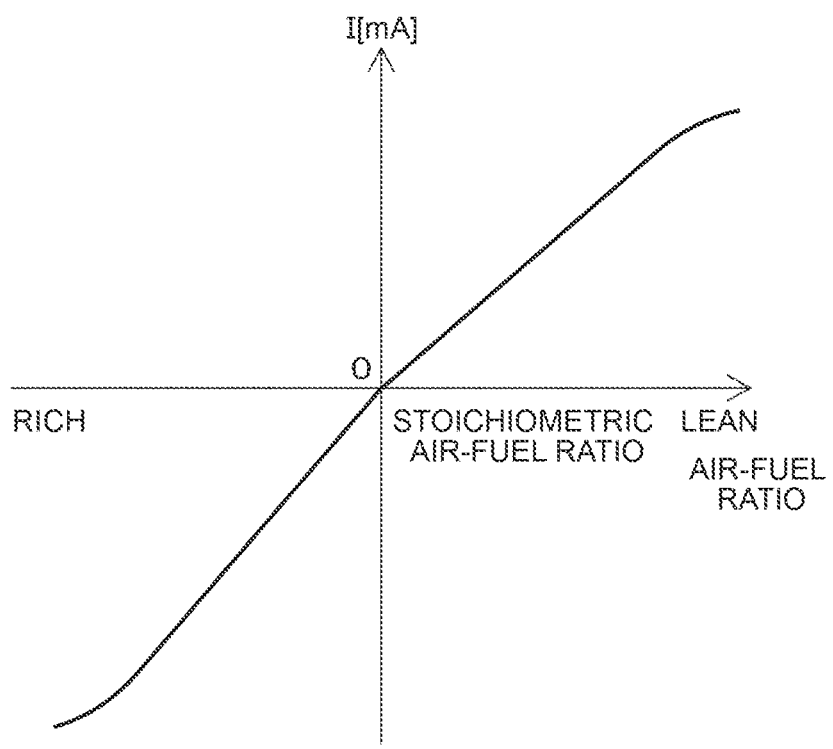
FIG. 5 illustrates the relationship between the air-fuel ratio of exhaust gas and the output current when the applied voltage is 0.45 V.

FIG. 5 illustrates the relationship between the air-fuel ratio of the exhaust gas and the output current I when the applied voltage is 0.45 V. That is, FIG. 5 illustrates the relationship between the air-fuel ratio of the exhaust gas and the output current I at the points on the dashed line in FIG. 4. As can be seen from FIG. 5, the output current I of the air-fuel ratio sensor 10 is zero when the air-fuel ratio of the exhaust gas is the stoichiometric air-fuel ratio. In the air-fuel ratio sensor 10, the higher the oxygen concentration of the exhaust gas, that is, the leaner the air-fuel ratio of the exhaust gas, the larger the output current I of the air-fuel ratio sensor 10. Accordingly, the air-fuel ratio sensor 10 can continuously (linearly) detect the air-fuel ratio of the exhaust gas.

As shown in FIG. 3, the control device 1 for an exhaust sensor further includes a heater control unit 2 and a heater drive circuit 3. In the present embodiment, the ECU 31 (electronic control device) functions as the heater control unit 2. The heater control unit 2 is a functional block that is implemented by the CPU 35 of the ECU 31 executing programs stored in the ROM 34 of the ECU 31. The heater drive circuit 3 is connected to the ECU 31 and the heater 20.

In order to accurately detect the air-fuel ratio of the exhaust gas using the air-fuel ratio sensor 10, it is necessary to activate the sensor element 11 of the air-fuel ratio sensor 10. Accordingly, the heater control unit 2 supplies electric power to the heater 20 of the air-fuel ratio sensor 10 via the heater drive circuit 3 in order to heat the sensor element 11 by the heater 20.

Specifically, the heater control unit 2 controls the electric power that is supplied to the heater 20 by pulse width modulation (PWM) control. In the PWM control, an effective voltage to the heater 20 is controlled by changing the duty cycle by changing the switching pulse width (on-time) with a fixed switching period (frequency). The duty cycle is calculated by dividing the pulse width by the period (duty cycle=pulse width/period). The longer the pulse width, the higher the duty cycle. For example, the voltage of a battery mounted on the vehicle is applied to the heater 20 during on-time.

Figure 6:
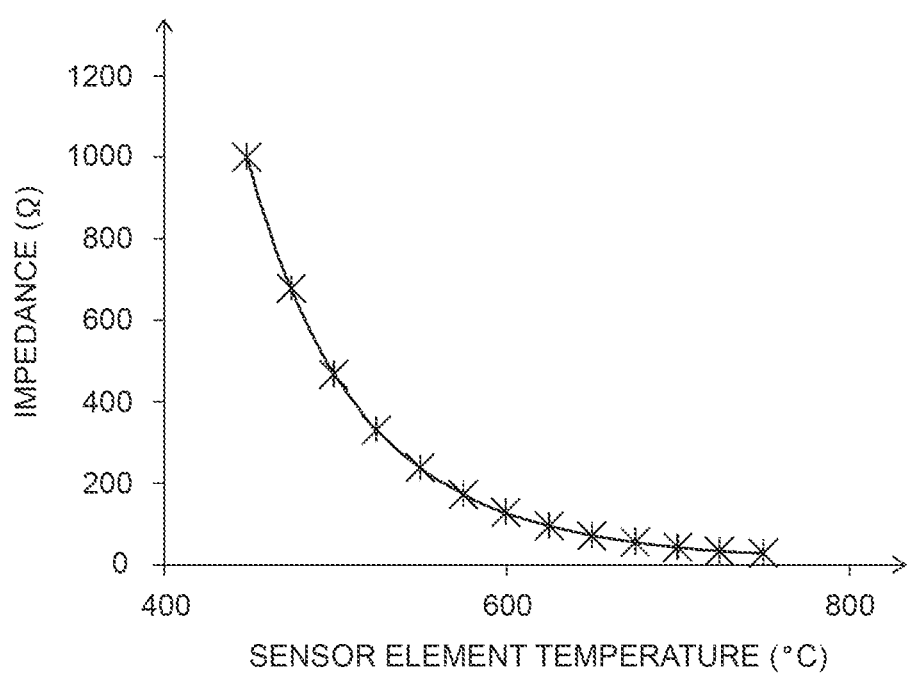
FIG. 6 is a graph illustrating the relationship between the temperature of a sensor element and the impedance of the sensor element.

In order to ensure the detection accuracy of the air-fuel ratio sensor 10, it is necessary to keep the sensor element 11 of the air-fuel ratio sensor 10 active. Accordingly, the heater control unit 2 controls the electric power that is supplied to the heater 20 so that the sensor element 11 has a temperature equal to or higher than an active temperature. As shown in FIG. 6, the temperature of the sensor element 11 correlates with the impedance of the sensor element 11. Accordingly, in the present embodiment, the heater control unit 2 feedback-controls the electric power that is supplied to the heater 20, based on the impedance of the sensor element 11. For example, the impedance of the sensor element 11 is calculated based on the output current of the air-fuel ratio sensor 10 that is detected by the current detection circuit 5 when a high-frequency alternating current (AC) voltage is applied from the voltage application circuit 4 to the sensor element 11.

Specifically, the heater control unit 2 controls the electric power that is supplied to the heater 20 so as to bring the impedance of the sensor element 11 to a desired value. When the impedance of the sensor element 11 is higher than the desired value, the duty cycle in the PWM control is increased to increase the electric power that is supplied to the heater 20. When the impedance of the sensor element 11 is lower than the desired value, the duty cycle in the PWM control is reduced to reduce the electric power that is supplied to the heater 20.

However, as the sensor element 11 degrades, the value of the element impedance corresponding to the same element temperature increases. Accordingly, the sensor element 11 may overheat when the above feedback control is performed. In order to reduce overheating of the sensor element 11, it is desirable to be able to monitor the temperature of the sensor element 11 based on a parameter other than the impedance.

In this regard, the inventors found through their studies that a variation in output current of the air-fuel ratio sensor 10 changes according to the temperature of the sensor element 11. This phenomenon is considered to occur due to noise from the heater 20. In the PWM control of the heater 20 described above, on-off switching is repeatedly performed, and the value of the current flowing in the heater 20 changes significantly upon switching. Noise generated at this time is superimposed on the output current of the air-fuel ratio sensor 10.

Figure 7A:
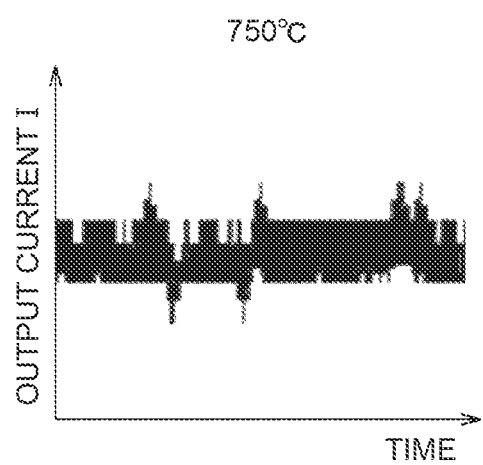
FIGS. 7A and 7B illustrate examples of the output current of the air-fuel ratio sensor with noise from a heater superimposed thereon.
Figure 7B:
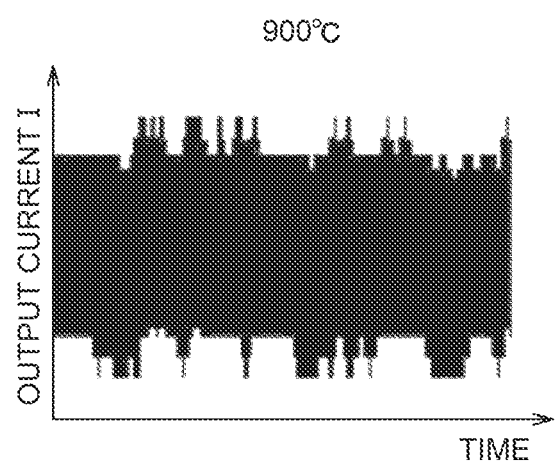

FIGS. 7A and 7B illustrate examples of the output current I of the air-fuel ratio sensor 10 with the noise from the heater 20 superimposed thereon. FIG. 7A illustrates changes in output current I with time when the temperature of the sensor element 11 is 750° C., and FIG. 7B illustrates changes in output current I with time when the temperature of the sensor element 11 is 900° C.

The solid electrolyte layer 12 of the sensor element 11 is an oxide ion conductive layer that transfers oxide ions between the electrodes at normal operating temperature. However, when the temperature of the sensor element 11 becomes excessively high, the solid electrolyte layer 12 starts to conduct substances other than oxide ions. As a result, as shown in FIGS. 7A and 7B, the higher the temperature of the sensor element 11, the greater the influence of the noise from the heater 20, and the greater the variation in output current of the air-fuel ratio sensor 10.

Accordingly, when the variation in output current of the air-fuel ratio sensor 10 detected by the current detection circuit 5 is equal to or greater than a threshold, the heater control unit 2 sets the upper limit value of the duty cycle in the PWM control to a value lower than when this variation is smaller than the threshold. The electric power that is supplied to the heater 20 is thus limited when the temperature of the sensor element 11 is excessively high. Overheating of the sensor element 11 is thus reduced.

Upper Limit Value Setting Process

Control for setting the upper limit value of the duty cycle in the PWM control will be described with reference to the flowchart of FIG. 8. FIG. 8 is a flowchart of a control routine of an upper limit value setting process according to the first embodiment of the disclosure. The ECU 31 repeatedly executes this control routine at predetermined time intervals after the internal combustion engine is started.

First, in step S101, the heater control unit 2 determines whether the sensor element 11 of the air-fuel ratio sensor 10 is active. For example, the heater control unit 2 determines that the sensor element 11 is active when a predetermined time has elapsed since the start of the internal combustion engine. The heater control unit 2 may calculate the temperature of the sensor element 11 based on the impedance of the sensor element 11 and may determine that the sensor element 11 is active when the calculated temperature of the sensor element 11 is equal to or higher than a predetermined active temperature.

The control routine ends when the heater control unit 2 determines in step S101 that the sensor element 11 is not active. The control routine proceeds to step S102 when the heater control unit 2 determines in step S101 that the sensor element 11 is active.

In step S102, the heater control unit 2 acquires a variation $\Delta I$ in output current of the air-fuel ratio sensor 10 detected by the current detection circuit 5. For example, the variation $\Delta I$ in output current is calculated as the difference between the maximum and minimum values of the output current of the air-fuel ratio sensor 10 detected by the current detection circuit 5 during a predetermined time period. The variation $\Delta I$ in output current may be calculated as, e.g., a variance (square of deviation) of the output current of the air-fuel ratio sensor 10 detected by the current detection circuit 5 during a predetermined time period.

Thereafter, in step S103, the heater control unit 2 determines whether the variation $\Delta I$ in output current of the air-fuel ratio sensor 10 is equal to or greater than a threshold TH. The threshold TH is experimentally determined in advance and is set to a value corresponding to a temperature that may degrade the sensor element 11 (e.g., 1,000° C. or higher). The control routine ends when the heater control unit 2 determines in step S103 that the variation $\Delta I$ is smaller than the threshold TH.

The control routine proceeds to step S104 when the heater control unit 2 determines in step S103 that the variation $\Delta I$ in output current is equal to or greater than the threshold TH. In step S104, the heater control unit 2 reduces the upper limit value of the duty cycle in the PWM control. The control routine ends after step S104.

When the heater control unit 2 determines in step S103 that the variation $\Delta I$ in output current is equal to or greater than the threshold TH, the heater control unit 2 may determine that the air-fuel ratio sensor 10 is abnormal in addition to performing step S104 and may turn on a warning light in the vehicle.

Noise that is superimposed on the output current of the air-fuel ratio sensor 10 becomes remarkable in the period of the PWM control for the heater 20. Therefore, in step S102, the heater control unit 2 may acquire a variation in output current of the air-fuel ratio sensor 10 detected by the current detection circuit 5 and synchronized with the period of the PWM control. That is, when the variation in output current of the air-fuel ratio sensor 10 detected by the current detection circuit 5 and synchronized with the period of the PWM control is equal to or greater than the threshold, the heater control unit 2 may set the upper limit value of the duty cycle in the PWM control to a value lower than when this variation is smaller than the threshold. In this case, for example, a bandpass filter corresponding to the period (frequency) of the PWM control is provided in the current detection circuit 5, and the heater control unit 2 acquires the output current of the air-fuel ratio sensor 10 detected through the bandpass filter.

The greater the variation $\Delta I$ in output current of the air-fuel ratio sensor 10, the higher the estimated temperature of the sensor element 11. Accordingly, in step S104, the heater control unit 2 may set the upper limit value of the duty cycle so that the greater the variation $\Delta I$ in output current, the lower the upper limit value of the duty cycle. That is, as the variation $\Delta I$ in output current increases, the upper limit value of the duty cycle may be reduced by a larger amount. Overheating of the sensor element 11 is thus more effectively reduced.

Second Embodiment

A control device for an exhaust sensor according to a second embodiment is basically similar in configuration and control to the control device for an exhaust sensor according to the first embodiment except for the points described below. Therefore, the second embodiment of the disclosure will be described focusing on the differences from the first embodiment.

As described above, the heater control unit 2 limits the duty cycle in the PWM control of the heater 20 based on the variation in output current of the air-fuel ratio sensor 10. However, even when the temperature of the sensor element 11 is normal, the variation in output current of the air-fuel ratio sensor 10 may increase due to a change in air-fuel ratio of the exhaust gas. In such a case, it is not necessary to limit the duty cycle in the PWM control. The air-fuel ratio of the exhaust gas tends to change significantly during transient operation of the internal combustion engine.

Accordingly, in the second embodiment, when the variation in output current of the air-fuel ratio sensor 10 detected by the current detection circuit 5 during steady-state operation of the internal combustion engine is equal to or greater than the threshold, the heater control unit 2 sets the upper limit value of the duty cycle in the PWM control to a value lower than when this variation is smaller than the threshold. This reduces the possibility that the duty cycle may be limited even though the temperature of the sensor element 11 is normal, and overheating of the sensor element 11 is more appropriately reduced.

Upper Limit Value Setting Process

FIG. 9 is a flowchart of a control routine of an upper limit value setting process according to the second embodiment of the disclosure. The ECU 31 repeatedly executes this control routine at predetermined time intervals after the internal combustion engine is started.

First, as in step S101 of FIG. 8, the heater control unit 2 determines in step S201 whether the sensor element 11 of the air-fuel ratio sensor 10 is active. The control routine ends when the heater control unit 2 determines in step S201 that the sensor element 11 is not active. The control routine proceeds to step S202 when the heater control unit 2 determines in step S201 that the sensor element 11 is active.

In step S202, the heater control unit 2 determines whether the internal combustion engine is operating in the steady state. For example, the heater control unit 2 determines that the internal combustion engine is operating in the steady state when a variation in predetermined operation parameter of the internal combustion engine is equal to or smaller than a predetermined value. For example, the predetermined operation parameter is an intake air amount, an engine speed, a fuel injection amount, engine load, etc. The intake air amount is calculated based on the output of the air flow meter 70, the engine speed is calculated based on the output of the crank angle sensor 73, the fuel injection amount is calculated based on a command value from the ECU 31 to the fuel injection valve 51, and the engine load is calculated based on the output of the load sensor 72. The heater control unit 2 may determine that the internal combustion engine is operating in the steady state when a variation in moving average value of the output current of the air-fuel ratio sensor 10 is small.

The control routine ends when the heater control unit 2 determines in step S202 that the internal combustion engine is operating in the transient state. The control routine proceeds to step S203 when the heater control unit 2 determines in step S202 that the internal combustion engine is operating in the steady state. Since steps S203 to S205 are similar to steps S102 to S104 of FIG. 8, description thereof will be omitted. The control routine can be modified in a manner similar to that of the control routine of FIG. 8.

Third Embodiment

A control device for an exhaust sensor according to a third embodiment is basically similar in configuration and control to the control device for an exhaust sensor according to the first embodiment except for the points described below. Therefore, the third embodiment of the disclosure will be described focusing on the differences from the first embodiment.

As described above, the heater control unit 2 controls the electric power that is supplied to the heater 20 so as to bring the impedance of the sensor element 11 to the desired value. In this case, when there is no change in correspondence between the element temperature and the element impedance, the sensor element 11 is maintained at a desired operating temperature, and the variation in output current of the air-fuel ratio sensor 10 is smaller than the threshold. However, when the value of the element impedance corresponding to the same element temperature increases, the temperature of the sensor element 11 becomes excessively high when the feedback control is performed so as to bring the impedance to the desired value. As a result, the variation in output current of the air-fuel ratio sensor 10 becomes equal to or greater than the threshold.

As described above, the temperature of the sensor element 11 can be reduced by limiting the upper limit value of the duty cycle when the variation in output current of the air-fuel ratio sensor 10 is equal to or greater than the threshold. As a result, the impedance of the sensor element 11 becomes lower than the desired value. Accordingly, even if overheating of the sensor element 11 can be reduced, it may not be possible to appropriately feedback-control the temperature of the sensor element 11.

In the third embodiment, when the variation in output current of the air-fuel ratio sensor 10 is equal to or greater than the threshold, the heater control unit 2 changes the desired value so that this variation becomes smaller than the threshold. For example, the heater control unit 2 gradually reduces the duty cycle until the variation in output current of the air-fuel ratio sensor 10 becomes smaller than the threshold. The heater control unit 2 then sets the impedance of the sensor element 11 to the desired value at the time the variation becomes smaller than the threshold. The temperature of the sensor element 11 can thus be made closer to the desired operating temperature by feedback control, and reduction in detection accuracy of the air-fuel ratio by the air-fuel ratio sensor 10 is restrained.

Upper Limit Value Setting Process

FIG. 10 is a flowchart of a control routine of an upper limit value setting process according to a third embodiment of the disclosure. The ECU 31 repeatedly executes this control routine at predetermined time intervals after the internal combustion engine is started.

Steps S301 to S304 are performed in a manner similar to that of steps S101 to S104 of FIG. 8.

After step S304, in step S305, the heater control unit 2 changes the desired value so that the variation in output current of the air-fuel ratio sensor 10 becomes smaller than the threshold. For example, the heater control unit 2 gradually reduces the duty cycle until the variation in output current of the air-fuel ratio sensor 10 becomes smaller than the threshold. The heater control unit 2 then sets the impedance of the sensor element 11 to the desired value at the time the variation becomes smaller than the threshold. The desired value thus becomes larger than its original value. The control routine ends after step S305.

In step S305, when the variation in output current of the air-fuel ratio sensor 10 is equal to or greater than the threshold, the heater control unit 2 may correct the impedance of the sensor element 11 so that this variation becomes smaller than the threshold. That is, the heater control unit 2 may correct the impedance of the sensor element 11 instead of changing the desired value. In this case, for example, the heater control unit 2 gradually reduces the duty cycle until the variation in output current of the air-fuel ratio sensor 10 becomes smaller than the threshold, and sets the amount of correction of the impedance to the difference between the impedance of the sensor element 11 at the time the variation becomes smaller than the threshold and the desired value. The heater control unit 2 corrects the impedance by subtracting this amount of correction from the impedance.

This control routine can be modified in a manner similar to that of the control routine of FIG. 8.

Although the preferred embodiments of the disclosure are described above, the disclosure is not limited to these embodiments, and various modifications and alterations can be made without departing from the scope of the claims. For example, the air-fuel ratio sensor 10 may be disposed downstream of the catalyst 60.

The exhaust sensor that is controlled by the control device 1 for an exhaust sensor may be a nitrogen oxide sensor (NOx sensor) that detects nitrogen oxides (NOx) in exhaust gas, an ammonia sensor that detects the concentration of ammonia in exhaust gas, an oxygen sensor that detects that the air-fuel ratio of the exhaust gas is rich or lean, etc., instead of the air-fuel ratio sensor 10.

The above embodiments can be implemented in any combination. In the case where the second and third embodiments are combined, step S202 of FIG. 9 is performed between steps S301 and S302 in the control routine of FIG. 10.

What is claimed is:

1. A control device for an exhaust sensor configured to control the exhaust sensor disposed in an exhaust passage of an internal combustion engine, the control device comprising:
    a sensor element;
    a heater configured to heat the sensor element;
    a current detection circuit configured to detect an output current of the exhaust sensor; and
    an electronic control device configured to control electric power that is supplied to the heater by pulse width modulation control, wherein
    the electronic control device is configured to set an upper limit value of a duty cycle in the pulse width modulation control to a lower value, when a variation in the output current of the exhaust sensor detected by the current detection circuit is equal to or greater than a threshold, than when the variation is smaller than the threshold.

2. The control device according to claim 1, wherein the variation is a variation in the output current of the exhaust sensor synchronized with a period of the pulse width modulation control.

3. The control device according to claim 1, wherein the variation is a variation in the output current of the exhaust sensor detected by the current detection circuit when the internal combustion engine is operating in a steady state.

4. The control device according to claim 1, wherein the electronic control device is configured to control the electric power that is supplied to the heater so as to bring impedance of the sensor element to a desired value, and is configured to change the desired value so as to reduce the variation in the output current of the exhaust sensor to a value smaller than the threshold, when the variation is equal to or greater than the threshold.

5. The control device according to claim 1, wherein the electronic control device is configured to control the electric power that is supplied to the heater so as to bring impedance of the sensor element to a desired value, and is configured to correct the impedance so as to reduce the variation in the output current of the exhaust sensor to a value smaller than the threshold, when the variation is equal to or greater than the threshold.

6. The control device according to claim 1, wherein the electronic control device is configured to set the upper limit value in such a manner that the greater the variation in the output current of the exhaust sensor is, the lower the upper limit value is, when the variation is equal to or greater than the threshold.

* * * * *